United States Patent [19]

Stingl et al.

[11] 4,058,515
[45] Nov. 15, 1977

[54] METALLIZED PHENYL-AZO-NAPHTHOL COMPOUNDS

[75] Inventors: Hans Alfred Stingl, Toms River; John Elliott, Pine Beach, both of N.J.

[73] Assignee: Toms River Chemical Corporation, Toms River, N.J.

[21] Appl. No.: 475,225

[22] Filed: May 31, 1974

Related U.S. Application Data

[63] Continuation of Ser. No. 257,645, May 30, 1972, abandoned.

[51] Int. Cl.$^2$ .............................................. C09B 45/18
[52] U.S. Cl. .................................... 260/151; 260/147; 260/149; 260/150; 260/162; 260/163; 260/193; 260/194; 260/195; 260/200; 260/201; 260/204
[58] Field of Search ................................. 260/150, 151

[56] References Cited

U.S. PATENT DOCUMENTS

| 1,677,534 | 7/1928 | Straub et al. .......................... 260/150 |
| 2,033,341 | 3/1976 | Krzikalla et al. ..................... 260/151 |
| 2,468,172 | 4/1949 | Conzetti et al. .................. 260/150 X |
| 2,512,845 | 6/1950 | Widmer et al. ....................... 260/200 |
| 3,135,730 | 6/1964 | Heyna et al. .................... 260/150 X |
| 3,600,377 | 8/1971 | Stingl .................................... 260/200 |

FOREIGN PATENT DOCUMENTS 692,372  6/1953  United Kingdom .................. 260/151

*Primary Examiner*—Charles F. Warren
*Attorney, Agent, or Firm*—Karl F. Jorda; Edward McC. Roberts; Prabodh I. Almaula

[57] ABSTRACT

Metallized azo dyes of the formula

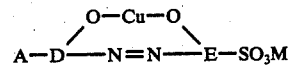

wherein A is a sulfonyl, sulfonamido or carboxamido group, D is the residue of a phenol or naphthol, E is the residue of acetoacetanilide, a phenyl or naphthyl pyrazolone or the residue of a naphthol and M is a cation. The dyes are suitable for dyeing natural and synthetic polyamides, demonstrating good all-around fastness properties.

5 Claims, No Drawings

METALLIZED PHENYL-AZO-NAPHTHOL COMPOUNDS

This application is a continuation of application Ser. No. 257,645, filed May 30, 1972, now abandoned.

BACKGROUND OF THE INVENTION

This invention relates to coppered azo dyestuffs containing a sulfonic acid group on one moiety of the molecule and a sulfonamido, sulfonyl or carboxamido group on the other. The invention also relates to various intermediate dyestuffs used in the preparation of these metallized dyes, to compositions, and to processes for preparing the metallized dyestuffs. Unmetallized monoazo dyestuffs containing a sulfonic acid group on the coupling component and a substituted sulfonamido group on the diazo component are known from U.S. Pat. No. 3,600,377. Although these known dyestuffs have good purity and brightness of shade and demonstrate good leveling properties, the light fastness of these compounds is not exceptional. Surprisingly, it has been found that coppering of the dyestuffs of the above-mentioned patent as well as other similar dyes produce compounds with drastically improved light fastness and remarkable brightness of shade on polyamide fibers.

Further, coppered monoazo dyestuffs containing a sulfonic group on the coupling component and an unsubstituted sulfonamido group on the diazo component are known from U.S. Pat. No. 3,511,827. These prior art dyestuffs, however, exhibit poor barré coverage as compared to the metallized dyestuffs of this invention. Furthermore, unmetallized and metallized (chromed or coppered) monoazo dyestuffs for wool containing a sulfonic group on the diazo component and an unsubstituted sulfonamido group on the coupling component are known from D.R.P. No. 463800 (Friedländer 16,946). These known dyestuffs, however, have a markedly reduced affinity toward natural and especially synthetic polyamide fibers as compared to the dyestuffs of this invention.

It was further found that, as compared with the prior art dyestuffs as mentioned above, the metallized dyestuffs of this invention generally have a combination of good fastness properties, such as good light fastness, barre coverage, leveling properties and purity and brightness of their shades. These properties and especially good barré coverage are a very important consideration in the dyeing or printing of nylon in order to cover up irregularities. It was surprising to find that the compounds of the instant invention, in view of the drawbacks of the prior art compounds mentioned, showed remarkable brightness of shade, good over-all fastness properties and especially excellent light fastness and good barré coverage.

SUMMARY OF THE INVENTION

This invention, therefore, relates to metallized monoazo dyestuffs containing a sulfonic acid group on one moiety of the molecule and a sulfonamido, sulfonyl or carboxamido group on the other, to intermediates thereof, to compositions and to processes for the preparation of said dyestuffs. These compounds are particularly suited for dyeing animal and artificial fibers of polyamides and polyurethanes in remarkably bright shades of red to violet and have good all-around fastness properties, particularly excellent light fastness and good barré coverage, which make them superior to similar dyes of the art.

DETAILED DESCRIPTION OF THE INVENTION

The metallized monoazo dyestuffs of this invention are those of the formula

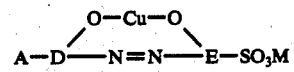

wherein A is

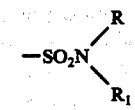

$-SO_2R_2$ or $-CONHR_3$ wherein R, $R_1$, $R_2$ and $R_3$ are each alkyl, hydroxyalkyl, alkoxyalkyl or hydroxyalkoxyalkyl each having up to 8 carbon atoms, phenyl, phenyl-$C_{1-2}$-alkylene or the latter two substituted on the phenyl moiety by chloro, bromo, nitro, trifluoromethyl, $C_{1-8}$-alkyl or $C_{1-8}$-alkoxy; R can also be hydrogen or β-cyanoethyl; D is the residue of a phenol or naphthol which may be substituted by at most two chloro, bromo, $C_{1-5}$-alkyl, $C_{1-5}$-alkoxy, nitro or trifluoromethyl; E is the residue of an acetoacetanilide, of 1-phenyl (or naphthyl)-3-methyl-5-pyrazolone or of 1-phenyl-3-methyl-5-pyrazolone substituted at the phenyl moiety by 1 or 2 chloro, bromo, $C_{1-5}$-alkyl, $C_{1-5}$-alkoxy, nitro or trifluoromethyl, whereby the $-SO_3M$ group is attached to the phenyl (or naphthyl) group, or the residue of a 1- or 2-naphthol; and M is hydrogen, alkali metal or ammonium; and each oxygen bridge is attached in the ortho position to the azo group. When D is the residue of a naphthol, E can also be the residue of a phenol which may be substituted by at most two chloro, bromo, $C_{1-5}$-alkyl, $C_{1-5}$-alkoxy, nitro or trifluoromethyl.

The more preferred metallized dyestuffs are those wherein R is hydrogen, methyl, ethyl, β-cyanoethyl or $C_{2-3}$-hydroxyalkyl; $R_1$, $R_2$ and $R_3$ are $C_{1-8}$-alkyl, phenyl or phenyl carrying up to two substituents chosen from $C_{1-2}$-alkyl, $C_{1-2}$-alkoxy and chlorine; $R_2$ may also be benzyl; D is the residue of a phenol where A is attached meta or para to the oxygen bridge, the residue of a 1- or 2-naphthol where A is $-SO_2NRR_1$ or $-SO_2R_2$ and attached in the 4- or 6-position, or the residue of a 2-naphthol where A is $-CONHR_3$ and attached in the 3-position; E is the residue of 1- or 2-naphthol wherein the $-SO_3M$ is attached on any position other than 1 or 2.

In the most preferred aspect of this invention, the novel compounds may be described by the following structural formulae

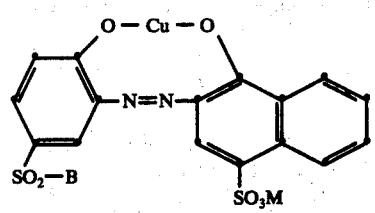

and

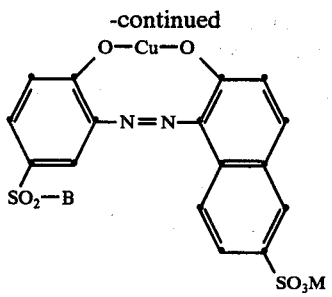

where B is benzyl or —NRR₁, wherein R is hydrogen, methyl, ethyl, β-cyanoethyl, β-hydroxyethyl and β- or γ-hydroxypropyl and R₁ is $C_{2-8}$-alkyl, phenyl or phenyl carrying up to two substituents chosen from methyl, methoxy, ethoxy and chlorine; M is hydrogen, $NH_4$ or sodium.

The dyestuffs of the present invention may be readily prepared by treating the corresponding unmetallized, o,o'-dihydroxy azo dyestuff or the corresponding unmetallized o-methoxy-o'-hydroxy azo dyestuff with a copper salt in an aqueous or nonaqueous medium by known methods, such as reaction of the monoazo dyestuff with copper sulfate in the presence of water and sodium acetate or ammonia, or with cupric nitrate in the presence of soda ash and an appropriate solvent such as methylcellosolve, near the reflux temperature of the system, until the reaction is complete.

Some of the unmetallized dyestuffs used for the preparation of the compounds of this invention are similarly novel and represent still another aspect of this invention. These dyestuffs may be used as intermediates as well as dyestuffs per se. As dyestuffs, they exhibit good purity and brightness of shade, good fiber affinity and good leveling properties. The novel unmetallized dyestuffs may be represented by the following structural formula

wherein X and X₁ are independently hydroxy or methoxy, ortho to the azo linkage, only one of X and X₁ is methoxy at any one time and X₁ cannot be methoxy when E is the residue of acetoacetanilide or of a pyrazolone; A is —SO₂R₂ or —CONHR₃ and in any position other than ortho to X, wherein R₂, R₃, D, E and M are as previously described and the azo linkage attaches ortho to X and X₁.

The preferred dyestuffs of the above formula correspond to the preferred metallized dyestuffs, and one of X and X₁ is methoxy.

The metallized dyestuffs of this invention, as indicated previously, may be prepared by diazotizing an aminobenzene compound of the formula

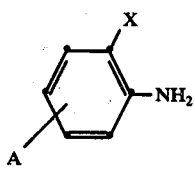

or a naphthylamine of the formula

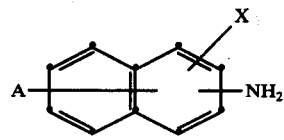

wherein X is hydroxy or methoxy ortho to the amino group, coupling the diazotized compound to a naphthol sulfonic acid or a sulfophenylmethylpyrazolone by well-known methods and subsequently metallizing the dyestuff.

Alternatively, the coupling can be done in reverse order by combining a diazotized orthoaminohydroxy- or orthoaminomethoxynaphthalene sulfonic acid with phenolic compounds of the formula

or naphtholic compounds of the formula (4)

$$A\text{—}\underset{\text{OH}}{\text{[naphthalene]}}$$

wherein the hydroxy group is in 1- or 2-position and A is attached in any position other than 1 or 2.

Compounds of formula (4) can also be combined with diazotized ortho-aminohydroxy- or ortho-aminomethoxybenzenesulfonic acids.

Diazo components of formula (1) and (2) above are known compounds and can be prepared by methods well known to those skilled in the art.

For example, those compounds of formula (1) wherein X is methoxy and A is a sulfonamido group may be prepared by treating N-acetyl-o-anisidine with chlorosulfonic acid to obtain the corresponding sulfonyl chloride derivative. This compound is then reacted with an appropriate primary or secondary amine and subsequently hydrolized to yield the desired amino compound.

Those compounds of formula (1) wherein A is a sulfone and X is methoxy may be prepared by treating N-acetyl-o-anisidine with chloro-sulfonic acid to obtain the corresponding sulfonylchloride derivative, which is then reduced to the sulfinic acid and reacted with alkylating agents like dimethylsulfate or benzylchloride, followed by hydrolysis to yield the desired amino compound.

Those compounds of formula (1) wherein A is a carbamido group and X is methoxy may for instance be prepared by combining 4-methoxy-3-nitrobenzoylchloride with a primary aliphatic or aromatic amine followed by reduction of the nitro.

On the other hand, those compounds of formula (1) wherein X is hydroxy and A is a sulfonamido group can be prepared by treating, for example, ortho-nitrochlorobenzene with chlorosulfonic acid to obtain 3-nitro-4-chlorobenzenesulfonylchloride, followed by treatment with a primary or secondary amine to yield the corresponding 3-nitro-4-chlorobenzene sulfonamido derivative. This product is then treated with caustic soda to yield the 3-nitro-4-hydroxybenzene sulfonamide and subsequently reduced to the desired 3-amino-4-hydroxybenzene sulfonamide.

Furthermore, 3-nitro-4-chlorobenzenesulfonylchloride can either be reacted with benzene or properly substituted benzenes under Friedel Crafts conditions or reduced to the sulfinic acid and alkylated as mentioned above to give the corresponding aryl- or alkylsulfones, respectively. These are then treated with caustic soda and subsequently reduced to the desired 3-amino-4-hydroxybenzenesulfones.

The isomeric 4-amino-3-hydroxybenzene sulfonamides or sulfones can be prepared by treating 1,3,2-benzoxazolone with chlorosulfonic acid, converting the resulting sulfonylchloride to the desired sulfonamido or sulfone derivatives as stated above, and finally opening the oxazolone ring under loss of $CO_2$, e.g., by a hot alkaline treatment.

Representative compounds of formula (1) that may be employed are:
  N',N'-diethyl-3-amino-4-methoxybenzenesulfonamide
  N'-n-butyl-3-amino-4-methoxybenzenesulfonamide
  N'-(γ-methoxypropyl)-3-amino-4-methoxybenzenesulfonamide
  N'-methyl-3-amino-4-methoxybenzenesulfonamide
  3-amino-4-methoxyphenylbenzylsulfone
  3-amino-4-methoxybenzanilide
  2-amino-1-phenol-4-sulfonanilide
  2-amino-4-(methylsulfonyl)phenol
  4-amino-3-hydroxy-4'-chlorobenzenesulfonanilide
and
  4-amino-2,5-dimethoxy-3'-trifluoromethylbenzenesulfonanilide.

Compounds of formula (2) may be suitably prepared, for example, as follows:

When X is methoxy, by treating the proper nitromethoxy- or acylamino-methoxy-naphthalenesulfonyl chlorides as described above for benzenesulfonyl chloride derivatives, followed by reduction or hydrolysis, respectively.

When X is hydroxy, by reacting a coupler of formula (4) with a diazonium compound and reducing the resulting azo compound.

The couplers of formula (3) and (4) can be obtained from the corresponding hydroxybenzene- or hydroxynaphthalenesulfonic acids, (after protection of the hydroxy group, e.g. by acylation with acetic anhydride etc.) by conversion to the sulfonyl chlorides and further reaction to the sulfonamides or sulfones as mentioned before followed by deacylation. Proper carbonamides are formed from corresponding hydroxybenzene- or hydroxynaphthalene carboxylic acids via their carbonylchlorides by a similar route.

Another general method of preparation for the couplers of formula (3) and (4) is the diazotization of the proper aminobenzene- or amino-naphthalenesulfonamides, -sulfones and -carbonamides and subsequent treatment of the resulting diazonium compounds at elevated temperatures.

Representative compounds of formula (2) that may be employed are:
  1-amino-2-methoxynaphthalene-6-sulfon-o-anisidide
  1-amino-2-hydroxynaphthalene-6-N'-methyl-N'-(β-hydroxyethyl) sulfonamide
  1-amino-2-hydroxynaphthalene-7-N-piperidylsulfonamide
  1-amino-2-hydroxy-4-(methylsulfonyl)naphthalene
  2-amino-1-hydroxynaphthalene-3-sulfonamide
  2-amino-1-hydroxynaphthalene-4-N'-isopropylsulfonamide
  2-amino-1-hydroxy-5-(benzylsulfonyl)naphthalene
and
  2-amino-1-hydroxynaphthalene-6-N',N'-di-(β-hydroxyethyl)sulfonamide.

Representative naphthol and pyrazolone couplers are:
  2',3', or 4'-sulfo-1-phenyl-3-methyl-5-pyrazolone
  2'-chloro-5'-sulfo-1-phenyl-3-methyl-5-pyrazolone
  2'-chloro-5'-sulfo-1-phenyl-3-methyl-5-pyrazolone
  6'-chloro-2'-methyl-4'-sulfo-1-phenyl-3-methyl-5-pyrazolone
  2'-methyl-4'-sulfo-1-phenyl-3-methyl-5-pyrazolone
  1-(6'-sulfonaphthyl-2-)-3-methyl-5-pyrazolone
  1-hydroxynaphthalene-3,4,5,6 or 7-sulfonic acid
and
  2-hydroxynaphthalene-5,6,7 or 8-sulfonic acid.

Representative compounds of formulae (3) and (4) are:
  1-hydroxybenzene-4-sulfon-o-toluidide
  N'-(β-cyanoethyl)-4-hydroxybenzenesulfonanilide
  1-hydroxy-4-(benzylsulfonyl)benzene
  4-hydroxy-3'-nitrobenzanilide
  1-hydroxynaphthalene-3-N'-ethylsulfonamide
  1-hydroxynaphthalene-4-N'-isopropylsulfonamide
  1-hydroxy-5-(benzylsulfonyl)naphthalene
  1-hydroxynaphthalene-6-N'-(β-hydroxylethyl)sulfonamide
  2-hydroxynapthalene-5-N'-(β-ethylhexyl)sulfonamide
  2-hydroxynaphthalene-6-N'-(cyclohexyl)sulfonamide
  2-hydroxynaphthalene-6-N'-methyl-N'-(β-hydroxyethyl)sulfonamide
  2hydroxy-6-(methylsulfonyl)napthalene
  2-hydroxynaphthalene-7-N'-(γ-methoxypropyl)sulfonamide
  3hydroxy-2-naphthanilide
and
  3-hydroxy-2-naphth-o-anisidide.

Representative diazotisable amines for the reverse order coupling are:
  1-amino-2-hydroxynaphthalene-4,5,6,7 or 8-sulfonic acid
  1-amino-2-methoxynaphthalene-6-sulfonic acid
  2-amino-1-hydroxynaphthalene-3,4,5,6 or 7-sulfonic acid
  2-amino-4-methoxybenzenesulfonic acid
  3-amino-4-hydroxybenzenesulfonic acid
  3-amino-4-hydroxy-6-methylbenzenesulfonic acid
  3-amino-4-hydroxy-6-chlorobenzenesulfonic acid
  4-amino-3-hydroxybenzenesulfonic acid
and
  4-amino-2,5-dimethoxybenzenesulfonic acid.

The metallized monoazo dyestuffs are particularly suitable for the dyeing of nylon material in aqueous dyebaths at pH values of 4 to 8, preferably 5 to 7, and at liquor ratios of 20:1 to 50:1. The initial pH is adjusted to the desired value by the addition of a suitable acid, such as acetic acid or alkali, such as sodium carbonate. Preferably, the dyebath is buffered during the dyeing cycle with a suitable buffering agent such as a mixture of monosodium phosphate and disodium phosphate. The amount of dyestuff used will depend on the depth of shade required and will range from 0.05% for light shades to 2.0% for heavy shades calculated on the weight of fiber taken. The temperature during the dyeing cycle may range from 80° to 100° C, preferably 95°–100° C and the duration of the cycle from 15 minutes to 2 hours, preferably 45 minutes to 75 minutes The following examples are given by way of illustration.

EXAMPLE 1

27.8 parts 3-amino-4-methoxy-benzenesulfonanilide are dissolved in 500 parts water at 70° C containing 49 parts of 10 N hydrochloric acid. The solution obtained is cooled to 0° C to 5° C and diazotized by the addition of an aqueous solution containing 7 parts sodium nitrite. The resulting diazo solution is gradually added to a stirred and iced solution of 22.4 parts 2-naphthol-6-sulfonic acid in 800 parts water containing 40 parts soda ash. The coupling mass is stirred for 1 hour at 5°–10° C and the dyestuff isolated by the addition of 5% salt (by volume). The dyestuff is filtered off and dried.

5.35 parts of the monoazo dyestuff, 2.7 parts cupric nitrate, 0.56 parts soda ash and 40 mls. methyl cellosolve are brought to gentle reflux and held at refluxing temperature for 10 hours. The reaction mixture is then cooled and filtered. The filter cake is washed with 5 mls. methyl cellosolve. The filter cake is then reslurried in 85 parts of 3% brine at room temperature for 1 hour and filtered, washed with 10 parts of a 5% brine solution and dried at 65°–70° C. The dyestuff thus produced has the formula

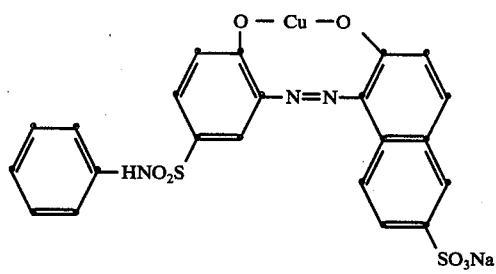

and dyes nylon from neutral or weakly acid dyebaths in bluish red shades with excellent light fastness and good wash fastness and barré coverage.

EXAMPLE 2

26.4 parts of 2-aminophenol-4-sulfonanilide are dissolved in 155 parts water at 35° C containing about 9 parts of caustic soda to pH~12.0 and the resulting solution clarified. The residue is washed with about 65 parts water and the clarified liquor and washings combined to give a total volume of about 250 mls. A solution of 7 parts sodium nitrite in 20 parts water are added. The clarified liquor containing sodium nitrite is then added gradually during 1 hour into a mixture of 46.5 parts 10 N hydrochloric acid, 250 parts cold water and 350 parts of ice. The mixture is stirred for 30 minutes at −2° C to 0° C. The excess nitrite is removed by the addition of a small quantity of sulfamic acid and the pH of the yellow precipitated diazo product is raised to about 3 by addition of about 5.5 parts soda ash.

The resulting diazo mixture is gradually added, with stirring, at 0° C to 2° C to an iced solution of 22.4 parts 2-naphthol-6-sulfonic acid in 800 parts water containing 40 parts soda ash. The coupling mass is then stirred overnight to room temperature (pH 9.5) and the dyestuff is isolated by the addition of salt (5% by volume).

The dyestuff is filtered and washed with 500 parts of a 10% brine solution and then dried.

10.4 parts of the dried monoazo dyestuff are slurried in 100 parts water at 75° C. The pH is reduced to about 4.9 by addition of 1.5 parts glacial acetic acid.

5 parts of copper sulfate dissolved in 20 parts water are added and the pH readjusted to 4.0–4.5 by addition of about 4 parts sodium acetate. The mixture is heated to 90°–95° C in 30 minutes and held at 90°–95° C for 2 hours. The resulting product is filtered hot and the filter cake washed with 25 parts of 2% brine solution and then dried. The dyestuff thus produced is the same as that from Example 1.

EXAMPLE 3

When the reaction is Example 1 is carried out using an equivalent amount of N'-n-butyl-3-amino-4-methoxy-benzenesulfonamide in place of 3-amino-4-methoxybenzenesulfonanilide a similar dyestuff is obtained with the formula

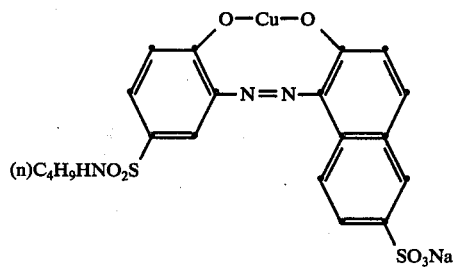

which dyes nylon in bright bluish red shades from weakly acid dye-baths with excellent light fastness and good barré coverage.

EXAMPLE 4

A similar dyestuff is obtained if an equivalent quantity of 3-amino-4-methoxy-N'-2-ethylhexylbenzenesulfonamide is used in place of 3-amino-4-methoxybenzenesulfonanilide in Example 1. The dyestuff has the formula

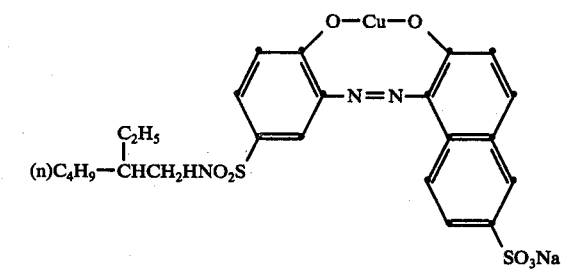

and dyes nylon from neutral or weakly acid dyebaths in bluish red shades with good fastness properties.

Similarly when N',N'-dibutyl-3-amino-4-methoxybenzenesulfonamide, N'-(β-hydroxyethyl)-3-amino-4-methoxybenzenesulfonanilide, N'-(γ-methoxypropyl)-3-amino-4-methoxybenzenesulfonamide, N'-(β-cyanoethyl)-3-amino-4-methoxy-4'-chlorobenzenesulfonanilide, 3-amino-4-methoxy-3'-nitrobenzenesulfonanilide, 3-amino-4-methoxy-4'-trifluoromethylbenzenesulfonanilide, 3-amino-4-methoxy-2'-ethylbenzenesulfonanilide, or N'-ethyl-3-amino-4-methoxy-4'-methoxybenzenesulfonanilide is used in place of 3-amino-4-methoxybenzenesulfonanilide in the above example, the appropriately substituted dyestuff is obtained.

EXAMPLE 5

25.8 parts of ground N'-n-butyl-3-amino-4-methoxybenzensulfonamide are dissolved in a mixture of 75 parts water and 29 parts 10 N hydrochloric acid. The solution is brought to 0° C with 75 parts of ice and diazotized by the rapid addition of a solution of 7 parts sodium nitrite in 20 parts water. The diazo is stirred for 1 ½ hours at 2° C to 5° C and then clarified. The clarified diazo is then added gradually to a stirred and iced solution of 22.4 parts 1-naphthol-4-sulfonic acid in 600 parts water containing 40 parts of soda ash. The reaction mixture is stirred for 1 hour at 2°-5° C and the dyestuff is then salted out by addition of 3% salt (based on volume) and filtered. The filter cake is then washed with 100 parts of 3% brine solution and dried.

5.15 parts of the dried monoazo dyestuff are stirred into a mixture of 5 parts cupric nitrate, 3.06 parts soda ash and 50 mls. methyl cellosolve. The reaction mixture is heated to reflux and held at reflux for 18 hours. The reaction mixture is then cooled to room temperature and filtered. The filter cake is reslurried in 75 parts water and completely precipitated from the liquor by addition of 16.5 parts common salt. The resulting precipitate is filtered and dried at 65°-70° C. The dyestuff thus produced has the formula

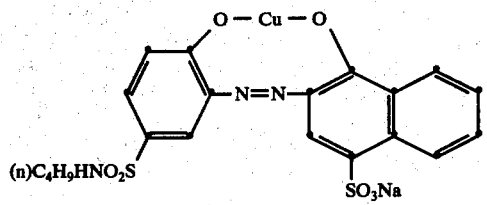

and dyes nylon from a neutral or weakly acid dyebath in bright reddish-violet shades with good light fastness and good barre coverage.

EXAMPLE 6

5.4 parts of the monoazo dyestuff, obtained by coupling N'-n-hexyl-3-amino-4-methoxybenzenesulfonamide with 1-naphthol-4-sulfonic acid, is refluxed for 15.5 hours in 40 mls. methyl cellosolve containing 3.2 parts cupric nitrate and 1.06 parts soda ash. The reaction product is filtered off after cooling to room temperature and the resulting filter cake reslurried in 90 parts water containing 3.7 parts common salt for 30 minutes. The filter cake isolated by filtration is washed with 20 parts of a 5% sodium chloride solution and dried. The dyestuff obtained has the following formula

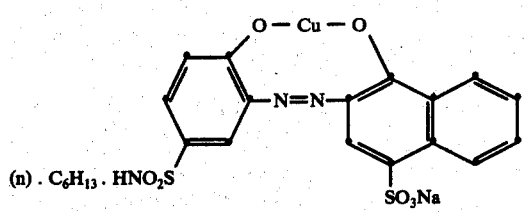

and dyes nylon in bright reddish-violet shades with excellent light fastness, good leveling properties and fair barré coverage.

Similarly, when the 3-amino-4-methoxybenzenesulfonamides mentioned at the end of Example 4 are used in place of N'-n-hexyl-3-amino-4-methoxybenzenesulfonamide, the appropriately substituted dyestuffs are obtained.

EXAMPLE 7

When N'-n-butyl-3-amino-4-methoxybenzenesulfonamide is replaced by an equivalent amount of 3-amino-4-methoxyphenylbenzylsulfone in Example 5, a similar dyestuff is obtained having the formula

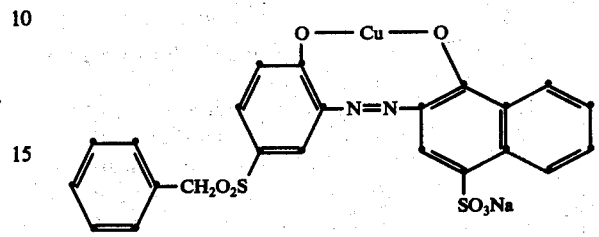

which dyes nylon from neutral to weakly acid dyebaths in bright bluish red shades with excellent light fastness and barré coverage, and good leveling properties.

Similarly, when 3-amino-4-methoxyphenyl-phenethylsulfone, 3-amino-4-methoxyphenyl-n-butylsulfone, 3-amino-4-methoxyphenyl-3'-methoxypropylsulfone or 3-amino-4-methoxyphenyl-p'-tolylsulfone is used in place of 3-amino-4-methoxyphenyl-benzylsulfone, the appropriately substituted deystuff is obtained.

Similarly, when the above-mentioned 3-amino-4-methoxyphenylsulfones are combined with 2-naphthol-6-sulfonic acid and coppered, the correspondingly substituted dyestuffs are obtained.

EXAMPLE 8

15.18 parts of dry monoazo dyestuff, obtained by coupling N',N'-diethyl-3-amino-4-methoxybenzenesulfonamide with 1-naphthol-4-sulfonic acid according to Example 5, is stirred into 6.8 parts cupric nitrate, 2.6 parts soda ash in 100 mls. methyl cellosolve. The reaction mixture is heated to reflux and held at reflux for 16 hours and then allowed to cool to room temperature. The product is filtered and washed with 40 mls. methyl cellosolve. The filter cake is recharged into 140 parts water containing 10 parts of common salt, stirred for 30 minutes at room temperature, refiltered and dried. The dyestuff has the formula

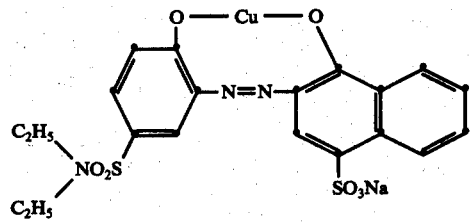

and dyes nylon in bright reddish violet shades with excellent light fastness and good barré coverage.

EXAMPLE 9

26.4 parts 2-aminophenol-4-sulfonanilide are coupled to 22.4 parts of 1-naphthol-4-sulfonic acid according to the procedure described in Example 2. 10.4 parts of the dried monoazo dyestuff thus obtained are treated with 5 parts copper sulfate in 20 parts water at 90°-95° C according to the procedure of Example 2. The dyestuff has the formula

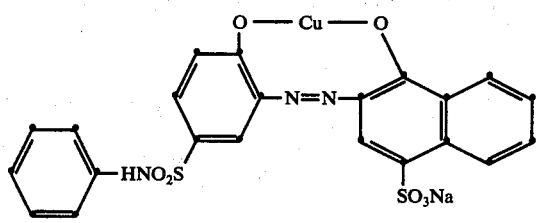

which dyes nylon in bright bluish red shades with good light fastness and barré coverage.

Similarly, when N'-isopropyl-2-aminophenol-4-sulfonamide, N',N'-methylbutyl-2-aminophenol-4-sulfonamide, N'-(β-hydroxypropyl)-2-aminophenol-4-sulfonamide, N'-(β-hydroxyethyl)2-aminophenol-4-sulfonanilide, 2-aminophenol-4-sulfon-o-chloro-o'-toluidide or 2-aminophenol-4sulfon-2',5'-dimethoxyanilide is used in place of 2-aminophenol-4-sulfonanilide, the appropriately substituted dyestuff is obtained.

Similarly, when the above-mentioned 2-aminophenol-4-sulfonamides are combined with 2-naphthol-6-sulfonic acid and coppered, the correspondingly substituted dyestuffs are obtained.

EXAMPLE 10

18.7 parts 2-aminophenol-4-methylsulfone are dissolved in 230 parts water at 65° C containing 18.5 parts of 10 N hydrochloric acid solution. The solution is iced to 0° C by the addition of about 250 parts ice and then diazotized by the addition of 7 parts sodium nitrite dissolved in 20 parts water. The diazo is stirred at 5°–8° C for 30 minutes and the volume adjusted to 700 mls. with ice and water. The diazo solution is then added gradually during 30 minutes to a stirred and iced solution of 22.4 parts 1-naphthol-4-sulfonic acid in 200 parts water containing 40 parts soda ash and 10 parts 1-naphthalenesulfonic acid, sodium salt. The coupling mass is then stirred overnight to room temperature and filtered. The filter cake is washed with 200 parts of 7.5% brine solution and dried.

8.9 parts of the dried monoazo dyestuff are treated with an aqueous solution containing 5 parts copper sulfate at pH 4.6 as described in Example 2 to yield a dyestuff with the following formula

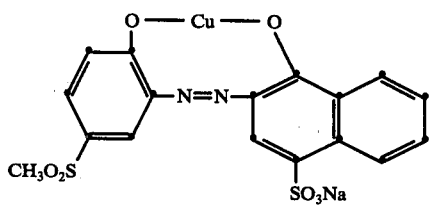

which dyes nylon in reddish violet shades with excellent light fastness and good barré coverage and leveling properties.

Similarly, when 2-aminophenol-4-ethylsulfone, 2-aminophenol-4-(3'-methoxypropyl)sulfone, 2-aminophenol-4-phenylsulfone, 2-aminophenol-4-p'-chlorophenylsulfone, 2-aminophenol-4-m-CF₃-phenylsulfone, 2-aminophenol-4-(o-nitrophenyl)sulfone or 2-aminophenol-4-2',4'-xylyl-sulfone is used in place of 2-aminophenol-4-methylsulfone, the appropriately substituted dyestuff is obtained.

EXAMPLE 11

A similar dyestuff is obtained when 1-naphthol-4-sulfonic acid is replaced by 2-naphthol-6-sulfonic acid in Example 10. The dyestuff has the formula

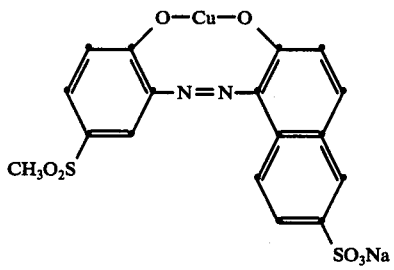

which dyes nylon in bluish red shades with good light fastness and leveling properties and good barré coverage.

Similarly, when the 2-aminophenol-4-sulfones mentioned at the end of Example 9 are combined with 2-naphthol-6-sulfonic acid and coppered, the correspondingly substituted dyestuffs are obtained.

EXAMPLE 12

4.99 parts of the monoazo dyestuff, obtained by coupling 3-amino-4-methoxybenzanilide with 1-naphthol-4-sulfonic acid, is refluxed for 24 hours in 40 mls. methyl cellosolve containing 5.7 parts cupric nitrate and 1.26 parts soda ash. The reaction product is filtered after cooling to room temperature and the filter cake is reslurried in 150 parts water. The slurry is filtered and the filter cake washed with 25 parts water and dried. The dyestuff obtained has the formula

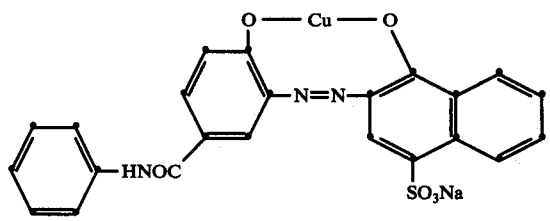

and dyes nylon from neutral dyebaths in bright reddish violet shades with excellent light fastness, good leveling properties and fair barré coverage.

Similarly, when N'-n-butyl-3-amino-4-methoxybenzamide, N'-(β-hydroxyethyl)-3-amino-4-methoxybenzamide, N'-(γ-methoxypropyl)-3-amino-4-methoxybenzamide, 3-amino-4-methoxy-4'-chlorobenzanilide, 3-amino-4-methoxy-2'-nitrobenzanilide, 3-amino-4-methoxy-4'-trifluoromethylbenzanilide or 3-amino-4-methoxy-4'-ethoxybenzanilide is used in place of 3-amino-4-methoxybenzanilide in the above example, the appropriately substituted dyestuff is obtained.

EXAMPLE 13

25.8 parts of N',N'-diethyl-3-amino-4-methoxybenzene-sulfonamide are diazotized as described for the amine in Example 5 and the resulting diazo solution is combined with a chilled mixture of 25.4 parts of m-sulfophenylmethylpyrazolone in 200 parts of water, 8 parts of caustic soda, 20 parts of soda ash and ice. 5 parts of salt per 100 parts of volume are added one hour later and the monoazo dyestuff is filtered off in a good form after heating to 85° C.

This monoazo dyestuff is stirred into a mixture of 400 parts of methyl cellosolve, 25 parts of cupric nitrate trihydrate and 5.2 parts of soda ash, heated and held at 116°–118° C for four hours. The reaction mass is cooled and diluted with an equal volume of water. The metallized dyestuff is precipitated with 50 parts of salt, filtered and dried. It has the formula

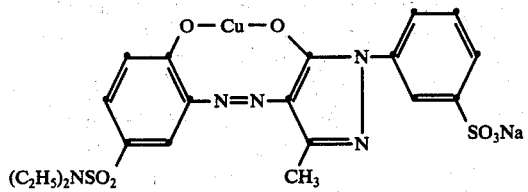

and dyes nylon in very light fast shades of orange.

Similarly, when using 4'-sulfophenyl-, 2'-chloro-5'-sulfo-phenyl-, 2'-methyl-4'-sulfo-phenyl-, or 6'-sulfo-2'-naphthylmethyl-pyrazolone in place of m-sulfophenyl-methylpyrazolone, the appropriately substituted dyestuff is obtained.

Similarly, when replacing N',N'-diethyl-3-amino-4-methoxybenzene-sulfonamide with N'-n-pentyl-, N'-m-nitrophenyl-, or N'-p-ethoxyphenyl-3-amino-4-methoxybenzenesulfonamide, with 3-amino-4-methoxybenzene-benzylsulfone, or with 3-amino-4-methoxybenzanilide, the appropriately substituted dyestuff is obtained.

EXAMPLE 14

26.4 parts of 2-aminophenol-4-sulfonanilide are diazotized as described in Example 2 and gradually added to a chilled solution of 26 parts of acetoacetanilide-p-sulfonic acid and 30 parts of soda ash in 200 parts of water. Stirring is continued overnight while the temperature rises to 18° C.

The product is precipitated with hydrochloric acid at pH 7.4, decanted, purified from 40% aqueous methanol containing 6% salt and dried. 11 parts of product thus obtained are coppered as described in Example 2. The resulting dyestuff has the formula

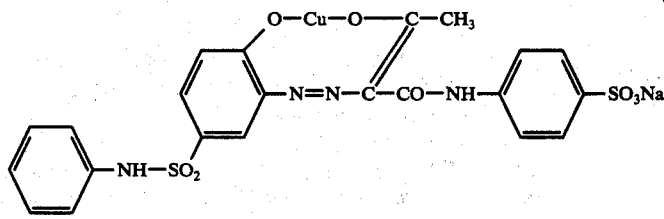

and dyes nylon in fast yellow shades.

Similarly, when acetoacetanilide-m-sulfonic acid, acetoacetanilide-4'-methoxy-3'-sulfonic acid, acetoacetanilide-2'-chloro-4'-sulfonic acid or acetoacet-2'-naphthylamide-6'-sulfonic acid is used in place of acetoacetanilide-p-sulfonic acid, the appropriately substituted dyestuff is obtained.

Similarly, when 2-aminophenol-4-sulfonanilide is replaced by 2-aminophenol-4-sulfonpiperidide, 2-aminophenol-4-benzylsulfone or 2-aminophenol-4-(n-octylcarbamide), the appropriately substituted dyestuff is obtained.

EXAMPLE 15

A mixture of 29.3 parts of 3-hydroxy-2-naphth-o-anisidide and 100 parts of hot water is made alkaline with 6 parts of caustic soda and cooled to 30° C. 25 parts of "diazo acid" [naphth(1,2-d) (1,2,3) oxadiazole-5-sulfonic acid] is added in portions, the pH is adjusted to 11 with acetic acid and stirring is continued for 20 hours. The product is filtered off at 46° C and washed with 3% salt solution.

5.65 parts of dried monoazo dyestuff thus obtained, 2.5 parts of copper sulfate pentahydrate and 1.75 parts of sodium acetate are stirred in 90 parts of water at 70°–90° C for 2 hours. 30 parts of 25% salt solution are added. The precipitate is filtered at 71° C, washed with 5% and 3% salt solution, and dried. Some impurity is removed with hot chloroform. A metallized dyestuff is obtained which has the formula

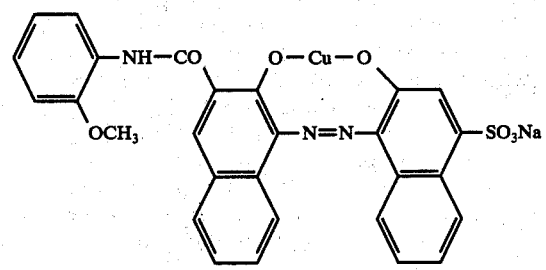

and dyes nylon from neutral or weakly acid dyebaths in level and bright bluish violet shades of excellent light fastness.

EXAMPLE 16

When 3-hydroxy-2-naphth-o-anisidide and diazo acid in the preceding example are replaced by 27.7 parts of 3-hydroxy-2-naphtho-o-toluidide and 29.5 parts of "nitrodiazo acid" [7-nitronaphth (1,2-d) (1,2,3) oxadiazole-5-sulfonic acid], respectively, and 6 parts of the dried coupling product are coppered, a dyestuff of the formula

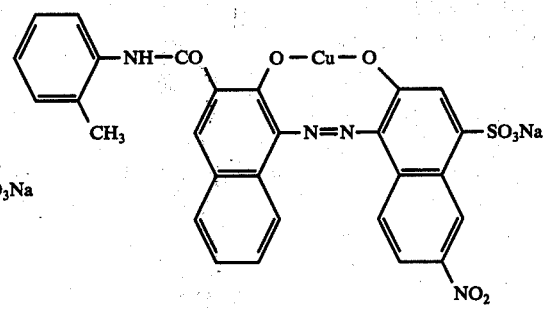

is obtained which dyes nylon in redder violet shades.

EXAMPLE 17

25.3 parts of 1-amino-2-methoxynaphthalene-6-sulfonic acid is dissolved in 200 parts of water at 42° C and caustic alkali to attain pH 7.6. Ice is added to cool to 2° C, followed by 20 parts of concentrated hydrochloric acid and sufficient alkali nitrate, as concentrated aqueous solution, to achieve complete diazotization.

This diazo preparation is stirred during one-half hour into a chilled mixture of 26.3 parts of 3-hydroxy-2-naphthanilide, 100 parts of water and excess caustic alkali. The temperature is permitted to rise and stirring is continued overnight at room temperature. 150 parts of 25% salt solution is added after heating to 70° C and the monoazo dyestuff is isolated by filtration, washed with 300 parts of 3% salt solution and dried.

5.6 parts of this monoazo dyestuff is heated in 80 parts of methylcellosolve together with 0.65 parts of soda ash and 2.9 parts of cupric nitrate trihydrate. A temperature of 112° to 118° C is maintained for 20 hours while successive additions of 1.5 parts of cupric nitrate, 0.1 part of soda ash and 4 parts of pyridine are made. The metallized product is filtered after cooling to room temperature, washed with 5 parts of methyl cellosolve, reslurried in 100 parts of water at 50° C, refiltered and dried. It has the formula

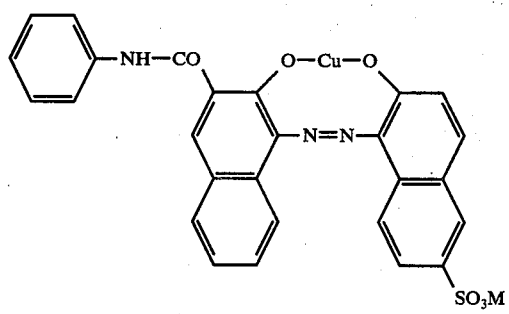

and dyes nylon from neutral or weakly acid dyebaths in bright violet shades.

EXAMPLE 18

When 29.3 parts of 3-hydroxy-2-naphth-o-anisidide is used in place of the anilide of the preceding example, and 5.8 parts of the dried coupling product are coppered, a similar dye-stuff obtains with the formula

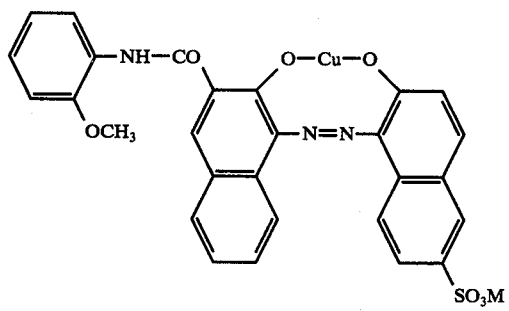

EXAMPLE 19

20.3 parts of 3-amino-4-methoxybenzenesulfonic acid are dissolved weakly alkaline in 80 parts of water and diazotized under 10° C by the successive addition of 30 parts of concentrated hydrochloric acid and 7 parts of sodium nitrite, as concentrated aqueous solution. This diazo preparation is stirred during two hours into a mixture of 30 parts of 2-hydroxynaphthalene-6-sulfonanilide, 100 parts of water and 5.3 parts of caustic soda at 5° C. When the coupling is finished, the suspension is diluted to 600 parts volume with water, the pH is reduced to 9.5, some salt is added, and the product is filtered. The filter cake is reslurried in 600 parts of water at 70° C, filtered off again, washed with 300 parts of 2% salt solution at 60° C, and dried.

5.5 parts of this monoazo dyestuff is stirred in 80 parts of methylcellosolve together with 3.4 parts of cupric nitrate trihydrate and 0.75 parts of soda ash at 116° to 120° C for five hours. After cooling, 90 parts of 15% salt solution are added and the metallized product is filtered at 37° C, washed with 75 parts of 3% salt solution and dried. It has the formula

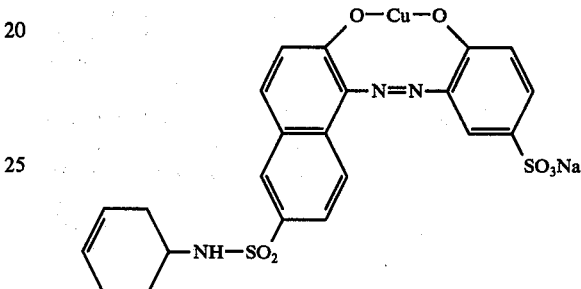

and dyes nylon from neutral or weakly acid dyebaths in bright bluish red shades.

EXAMPLE 20

When 1-hydroxynaphthalene-4-sulfonanilide is used in the preceding example in place of 2-hydroxynaphthalene-6-sulfonanilide, a similar dyestuff is obtained with the formula

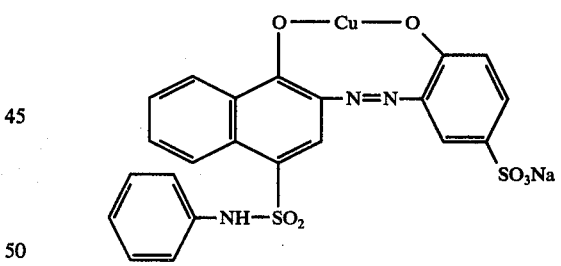

Similarly, when the sulfonanilides of Examples 19 and 20 are replaced by the corresponding hydroxynaphthalene-N',N'-dimethylsulfonanilides; -N'-n-hexylsulfonanilides; -N'-methyl-N'-(β-hydroxyethyl)sulfonanilides; -N'-(β-hydroxyethyl)sulfonanilides; -sulfonchloroanilides; -sulfontoluidides; -N'-ethylsulfonanisidides, or the hydroxynaphthalene-methyl, ethyl, or benzyl-sulfones, dyestuffs of the corresponding structures are obtained.

EXAMPLE 21

When the 3-amino-4-methoxybenzenesulfonic acid diazo preparation in Example 19 is replaced by the 1-amino-2-methoxynaphthalene-6-sulfonic acid diazo preparation of Example 17, a dyestuff obtains with the formula

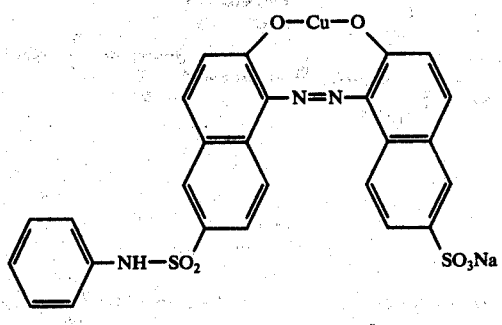

Similarly, when 2-hydroxynaphthalene-6-sulfonanilide is replaced by the couplers listed under Example 20, dyestuffs of the corresponding structures are obtained.

EXAMPLE 22

The diazo preparation of Example 19 is added to a chilled mixture of 26.3 parts of 3-hydroxy-2-naphthanilide, 160 parts of water and excess caustic soda during one and a half hours. Stirring is continued for several hours while the temperature is allowed to rise. The pH is eventually reduced to 10 with bicarbonate and the monoazo dyestuff is filtered, washed with 3% salt solution and dried. 5.6 parts of this monoazo dyestuff and 3.2 parts of cupric acetate monohydrate are stirred in 60 parts of water at 90°-95° C for 12 hours. The metallized product is filtered at 90° C, washed with 25 parts of 5% aqueous salt solution and dried. It has the formula

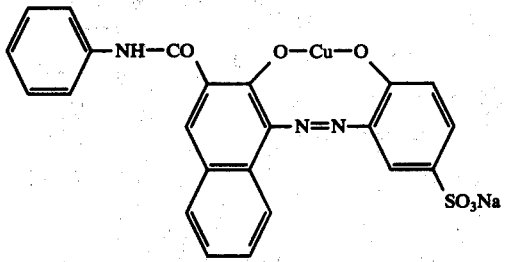

and dyes nylon from neutral or weakly acid dyebaths in bluish red shades.

The following dyestuffs may be similarly prepared from one or more of Examples 1–22.

Example 23

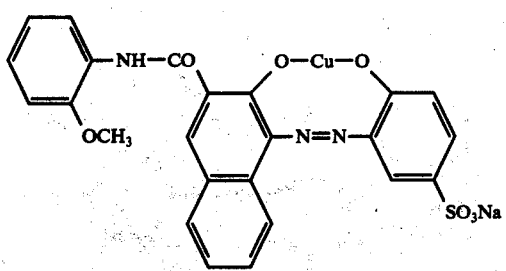

Example 24

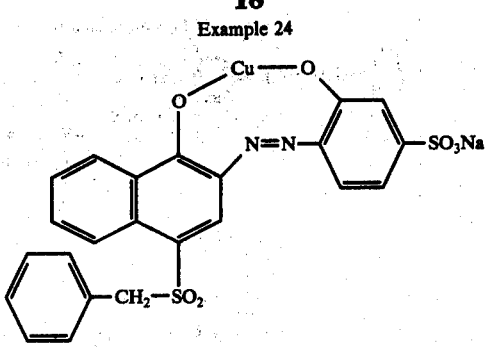

Example 25

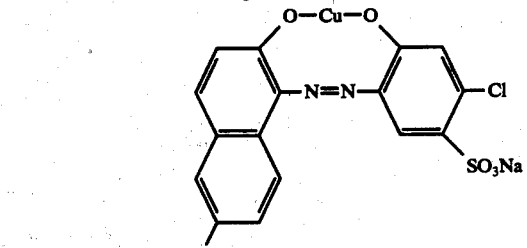

Example 26

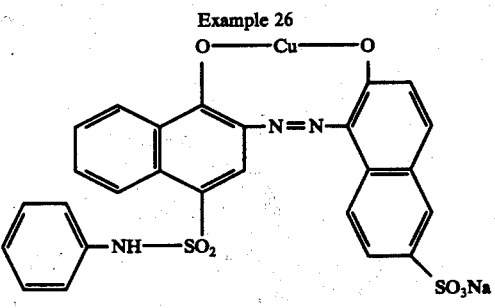

Example 27

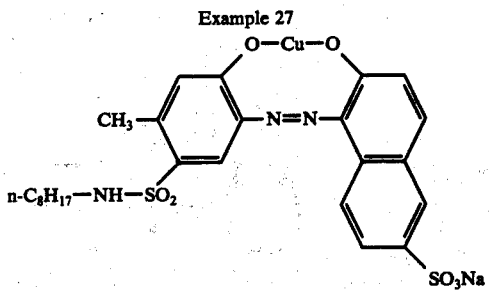

Example 28

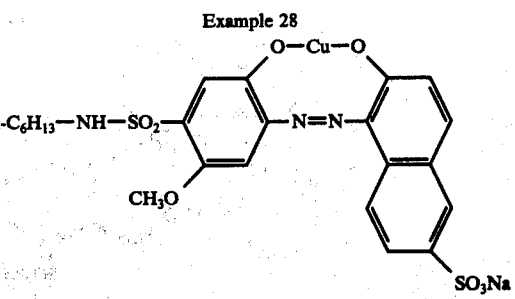

Example 29
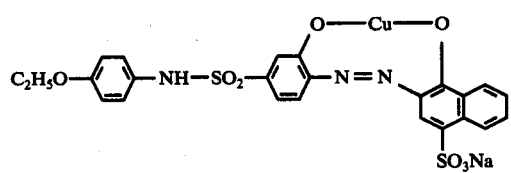
Example 35
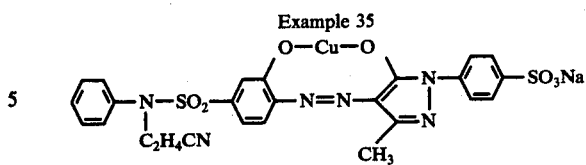
Example 30
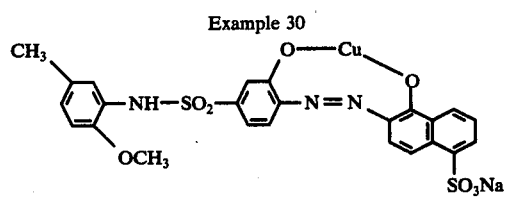
Example 36
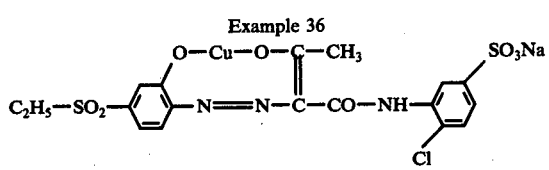
Example 31
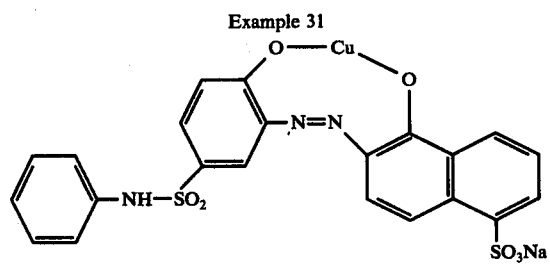
Example 37
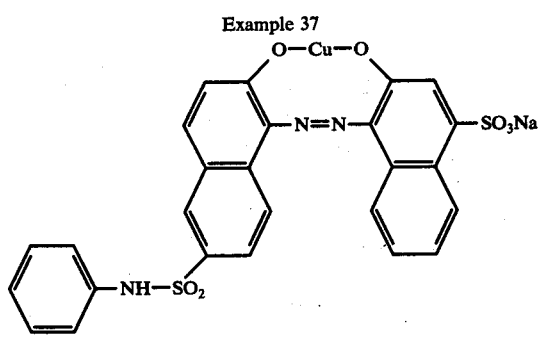
Example 32
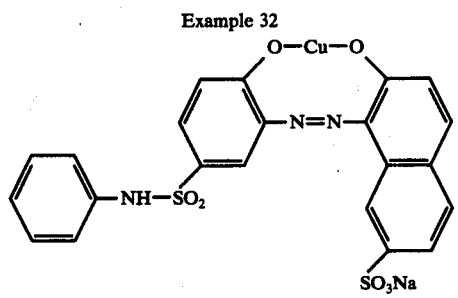
Example 38
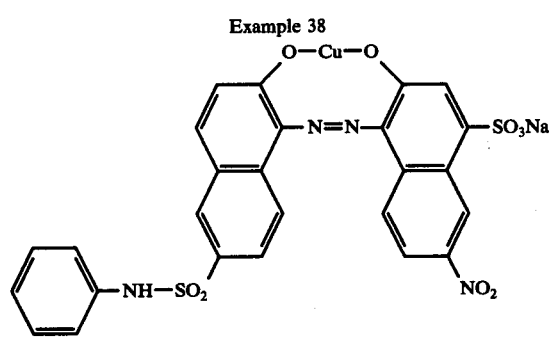
Example 33
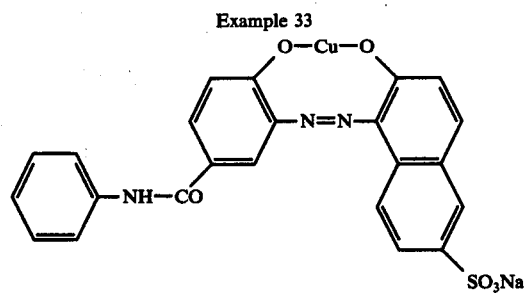
Example 39
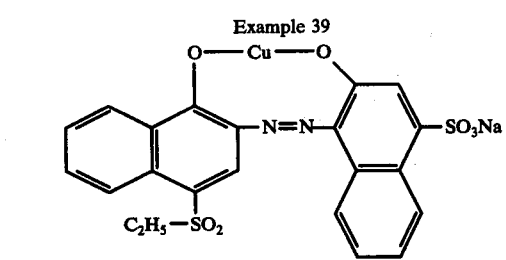
Example 34
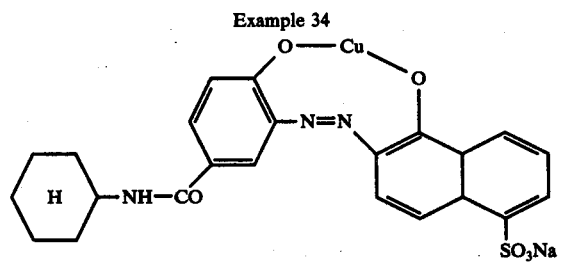
Example 40
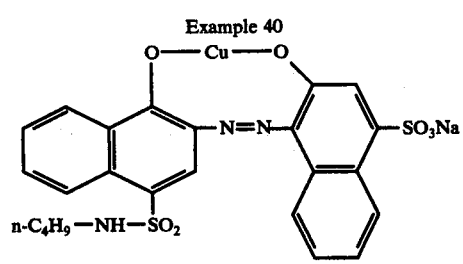

Example 41
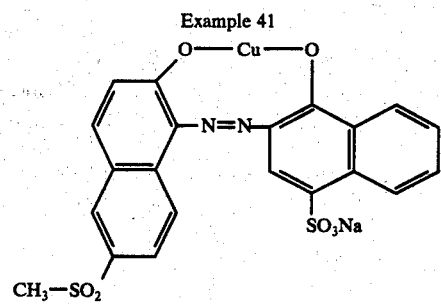
Example 42
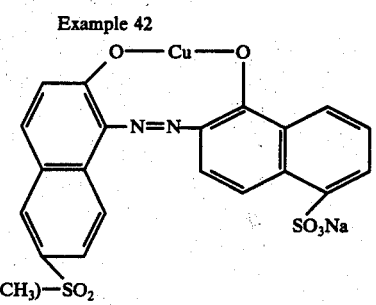
Example 43
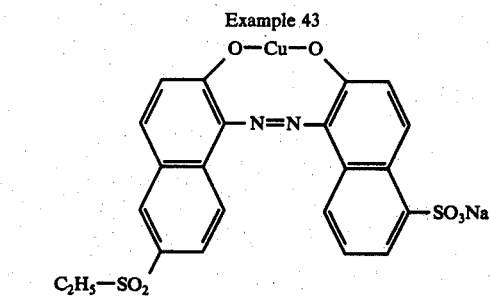
Example 44
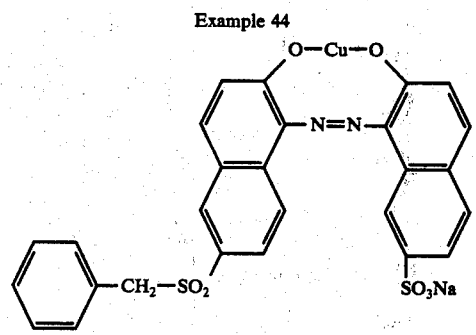
Example 45
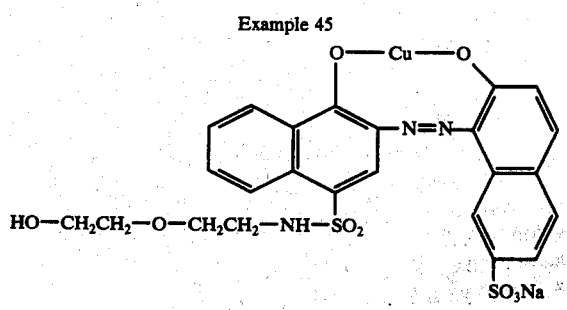
Example 46
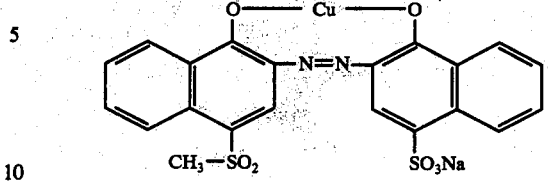
Example 47
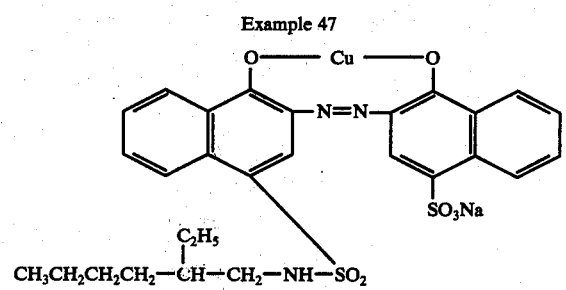
Example 48
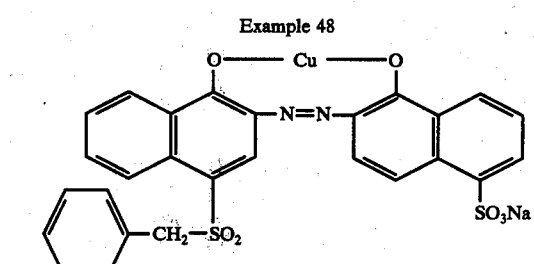
Example 49
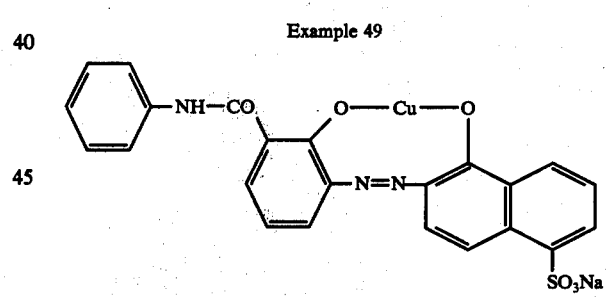
Example 50
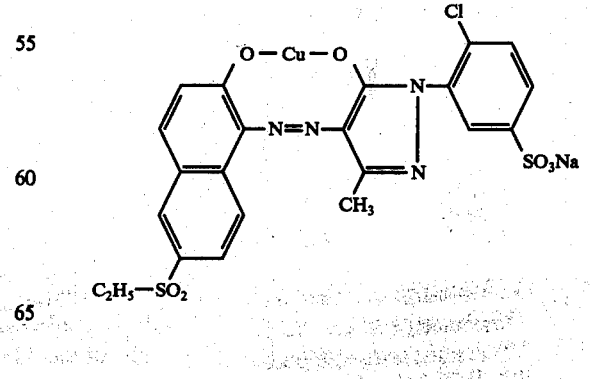

Example 51

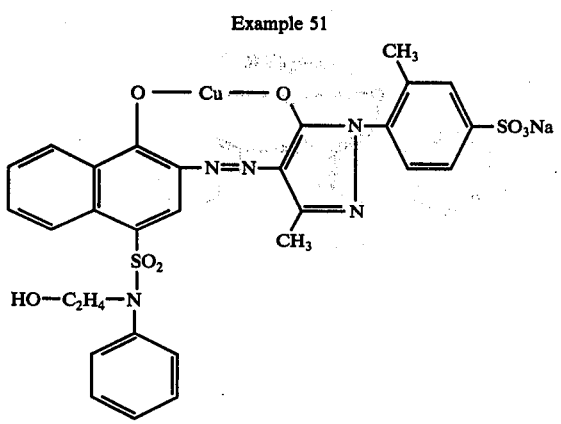

Example 52

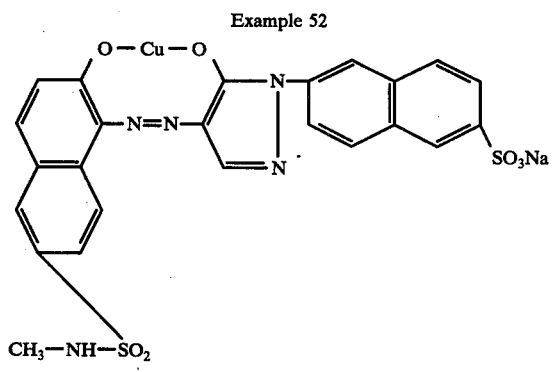

Example 53

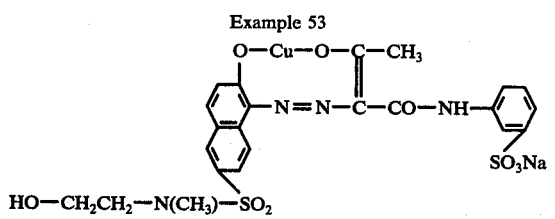

Example 54

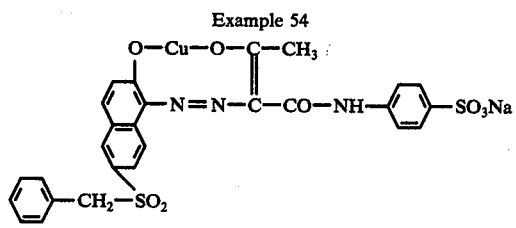

Example 55

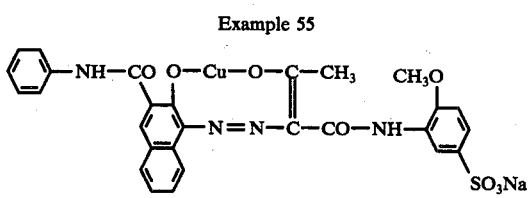

When the above-described preparations are carried out with potassium salts and caustic potash in place of sodium salts and caustic soda, the potassium salts of the corresponding dyestuffs are obtained.

EXAMPLE 56

To obtain the dyes in the form of their free acids, an aqueous suspension of an instant dye is rendered strongly acid with a mineral acid, e.g., concentrated hydrochloric acid, or sulfuric acid and the insoluble acid form of the dye is separated by filtration.

The free acid form of the dye can be neutralized with other bases, as for example lithium hydroxide, lithium carbonate or ammonia, to form dye salts containing the corresponding cations, as desired.

EXAMPLE 57

Into an aqueous dyebath containing 4000 parts by weight of water, 0.25 parts of the dyestuff described in Example 1, 1 part of nonionic wetting agent, nonylphenyl-polyethyleneglycol ether [ethyleneoxide condensation product of nonylphenol (TERGITOL-NPX Union Carbide)], 6 parts of monosodium phosphate and 0.75 parts of disodium phosphate, to maintain a pH of 6.0, 100 parts of nylon fabric are entered at 60° C. The temperature is raised to 100° C and held at 100°C for 1 hour while the fabric is mildly agitated to assure uniform dyeing. The fabric is then removed from the bath, rinsed with cold water, and dried. It is dyed a very even and fast shade of bluish red.

EXAMPLE 58

The procedure of Example 57 is repeated with 0.5 parts of the dyestuffs described in Examples 4, 5, 6, 8, 11, 12, and 21, respectively. One obtains even and fast shades of bluish red.

EXAMPLE 59

The procedure of Example 57 is repeated with 1.0 part of the dyestuffs described in Examples 15, 16, 17 and 18, respectively. One obtains fast and even shades of violet.

EXAMPLE 60

Into an aqueous dyebath containing 4000 part of water, 0.1 to 1.0 parts of the dyestuffs described in Examples 3, 7 and 9, respectively, or a mixture of them totaling 0.1 to 1.0 parts, one part of nonionic wetting agent, 10 parts of anhydrous sodium sulfate, and 10 parts of acetic acid, 100 parts of nylon fabric are entered at 60° C. The temperature is raised to 96° C in 45 minutes and held at 96° C for one hour while the fabric is mildly agitated. The fabric is then removed from the bath, rinsed with cold water and dried. It is dyed very even and fast shades of bluish red.

EXAMPLE 61

This example and Example 62 illustrate the use of the dyestuffs described in this application in differential dyeing nylon and demonstrate their utility in the differential dyeing of nylon carpeting. Into an aqueous dyebath containing 200 parts water at 40° C, 0.006 parts of the dyestuff described in Example 9, 2 parts of a nonionic wetting agent (Tergitol NPX, Union Carbide, a nonylphenyl polyethylene glycol ether), buffered at pH 6 with 0.4 parts sodium dihydrogen phosphate and 0.075 parts disodium hydrogen phosphate is entered 5 parts of Multi-Fabric Test Fabric Style 11 (Test Fabrics, Inc.) constructed of stripes of cationic-dyeable nylon (Nylon 844, E. I. du Pont de Nemours, Inc.), light acid-dyeable nylon (Nylon 845, du Pont), normal acid-dyeable nylon (Nylon 846, du Pont) and deep acid-dyeable nylon (Nylon 847, du Pont). The temperaure is raised to 96° C in 20 minutes and held at 96° C for 1 hour while the fabric is mildly agitated. The fabric is removed from the bath, rinsed with cold water and dried. The cationic-dyeable Nylon 844 is reserved white while the acid-dyeable Nylons 845, 846 and 847 showed excellent contrast, the depth of shade being approximately in the ratio of 0.05:0.2:1.1 for Nylons 845, 846 and 8.47, respectively. This example illustrates the use of the dyestuff of Example 9 for the dyeing of differential dyeing nylon carpeting.

EXAMPLE 62

The procedure of Example 61 is repeated using 0.00825 parts of the dyestuff of Example 4 in place of 0.006 parts of the dyestuff of Example 9. A similar result is obtained.

We claim:

1. A compound of the formula

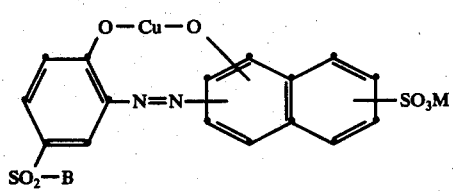

wherein B is benzyl or $-NRR_1$, wherein R is selected from the group consisting of hydrogen, methyl, ethyl, β-cyanoethyl, β-hydroxyethyl, β-hydroxypropyl and γ-hydroxypropyl; and $R_1$ is $C_{2-8}$-alkyl, phenyl or phenyl carrying up to two substituents selected from the group consisting of methyl, methoxy, ethoxy and chlorine; M is hydrogen, $NH_4$ or sodium; and the positions of the oxygen bridge, the azo linkage and the sulfonic acid group on the naphthol residue is either 1-2-4 or 2-1-6, respectively.

2. A compound of claim 1 of the formula

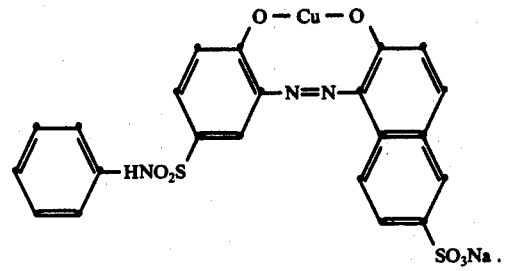

3. A compound of claim 1 of the formula

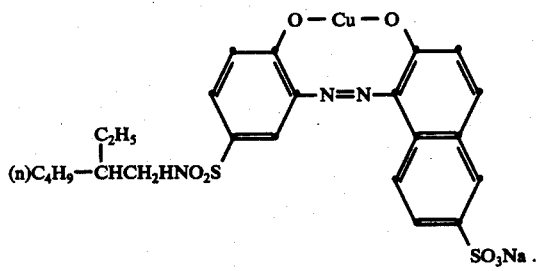

4. A compound of claim 1 of the formula

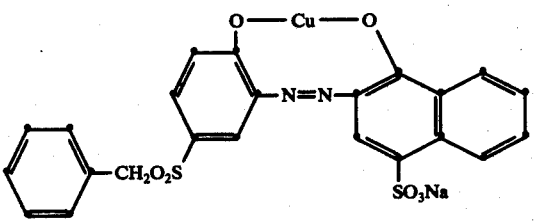

5. A compound of claim 1 of the formula

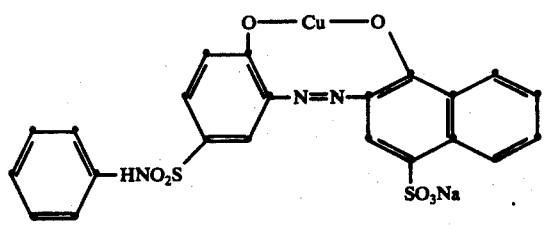

* * * * *